United States Patent
With

[11] 3,977,347
[45] Aug. 31, 1976

[54] PLANING OR SEMIPLANING BOAT

[76] Inventor: Bror With, Jarlsborgveien 1, Oslo 3, Norway

[22] Filed: June 19, 1974

[21] Appl. No.: 480,839

[30] Foreign Application Priority Data
June 25, 1973 Norway.............................. 2623/73

[52] U.S. Cl............................................ 114/66.5 S
[51] Int. Cl.²........................................... B63B 1/18
[58] Field of Search .......... 9/1 R, 6; 114/56, 66.5 S, 114/66.5 P, 67 R, 67 A; 115/15

[56] References Cited
UNITED STATES PATENTS

| | | | |
|---|---|---|---|
| 2,353,020 | 7/1944 | Dyer............................................ | 9/6 |
| 2,555,307 | 6/1951 | Aylsworth....................... | 114/66.5 S |
| 3,085,535 | 4/1963 | Hunt............................................ | 9/6 |
| 3,148,652 | 9/1964 | Canazzi .......................... | 114/66.5 S |

FOREIGN PATENTS OR APPLICATIONS

| | | | |
|---|---|---|---|
| 2,999 | 2/1906 | United Kingdom ............ | 114/66.5 S |

*Primary Examiner*—Trygve M. Blix
*Assistant Examiner*—Jesus D. Sotelo
*Attorney, Agent, or Firm*—Johnson, Dienner, Emrich & Wagner

[57] ABSTRACT

In a boat of the "planing" or "semiplaning" type and in which the rear portion of the bottom is substantially straight in the longitudinal direction and tapers rearwardly, the side faces of the hull are formed with rearwardly facing steps crossing the highest waterline and placed substantially at or behind the point of maximum bottom width, so as to cause ventilation of the rearwardly converging side faces at speeds below planing speed. This substantially eliminates the resistance caused by suction on said faces and permits the bottom to be given a pronounced rearward taper with a width of the bottom at the stern less than 70% of maximum width, with consequent improved performance at low speeds. To minimize flow disturbance the steps taper towards both ends and extend upwards and forwards with decreasing inclination.

9 Claims, 3 Drawing Figures

PLANING OR SEMIPLANING BOAT

BACKGROUND OF THE INVENTION

The invention relates to boats of the so-called planing or semiplaning type and has for an object to provide a hull design which in addition to permitting high maximum speed of the boat also causes relative little resistance at lower speeds when the boat is sailing more or less as a displacement boat.

Motor boats of today can be classified in two categories: Displacement boats and planing boats.

Displacement boats are running economically and performing nicely and conveniently at low speeds, but have a very limited maximum speed.

Planing boats are running easily at high speeds, but are in return both uneconomic and inconvenient at lower speeds, i.a. by causing big wash.

A boat buyer will very often desire a quick boat, if not for other reasons than for attaining fresh waters. When he has then come out there, it is of essential importance that the boat performs nicely at low speeds so that he can adapt the speed according to desire and conditions.

Today there does not exist any boat combining the desirable properties of both types of boats. It is true that there exist so-called semiplaning boats which in principle are displacements boats, but have a bottom design capable of affording a certain lift and hence permitting an increase of speed, but the speed is here still limited for reasons similar to those applying for normal displacement boats.

In order to attain high speeds with good utilization of the motor power, planing boats are normally designed with plane bottom faces and straight longitudinal lines, affording a lift so that the boat will slide on the water. Such boats are therefore mostly provided with a flat stern and made with a bottom width at the stern not much less than the maximum bottom width. Thus, researchers at the model tank of the Norwegian Technical University have found that the bottom width at the stern should not be less than 90% of the maximum width.

When such a boat is sailing with reduced speed as a displacement boat and hence lies relatively deeply in the water, the large stern gives rise to a big wake wave which apart from being a nuisance to the surroundings also means a considerable waste of power. When the boat is then to rise onto plane it will start by rearing, which requires considerable additional motor power.

If, on the other hand, the boat is given a more pronounced aft taper in order to behave better at low speed, the difficulties in rising onto plane will increase, due to suction by the water on the converging boat sides.

Considerable efforts have been devoted to reducing the water resistance during planing by ventilating the bottom by separate air supply and/or by shaping the bottom with more or less pronounced steps permitting the admission of air under the planing boat. The former expedient constitutes a complication causing increased costs, and the said steps in the bottom will only contribute in increasing the drawbacks referred to at low speed when the boat is sailing as a displacement boat.

SUMMARY OF THE INVENTION

The present invention which has for an object to solve these problems in a satisfactory manner, relates to a boat of the planing or semiplaning type the bottom of which tapers rearwardly from the cross-sectional plane of maximum width of the boat and in its rear portion is substantially straight in the longitudinal direction, i.e. with a hull design which in so far is not unusual for planing boats. The invention primarily consists in that at and/or astern of the said cross-sectional plane the boat sides are shaped with rearwardly facing exterior steps crossing the highest waterline of the boat.

These steps in the waterline will at speeds below planing speed and above all when a boat of the planing type shall rise onto plane cause air to be admitted to the boat sides so that these will be ventilated, whereby the aspiring force on the boat sides which otherwise always will counteract the lifting force from the bottom and deduct directly from the lifting force and which will be greater the more the bottom tapers aft, is practically eliminated so that the boat will rapidly and easily climb up to plane, and that with reduced rearing.

It is thereby also possible without hesitation to make the boat taper considerably more than what is usual for planing boats. This constitutes a great advantage at low speed, and during planing it will be of little importance. At the lowest planing speed the line or origin of the lifting force will hit the bottom substantially at the point of greatest width, and during planing the width of the part of the bottom further behind will be of doubtful value, since it partly only contributes in increasing the wet surface. If the speed is then further increased, the point of origin of the lifting force will constantly move rearwards towards the stern where the bottom has reduced width, which is ideal for great velocities.

Thus, it will be seen that the old rule that the bottom width at the stern must not be less than 90% of the maximum bottom width is no more generally valid when the boat is designed with steps in the side faces in accordance with the invention. On the contrary, in order to take advantage of the possibilities afforded by the invention, the width of the bottom at the rear ought to be less than 70% of maximum width, and tests have shown particularly good results within the range from 60 to 70%. It is also well possible to go further down or even omit the flat stern entirely, which may be desirable for combined motor- and sailboats.

A boat with such ratios of bottom width and with ventilated sides will at low speeds at which the ventilation is not operative, force the water masses along the sides together again in a horizontal flow behind the boat, and the violent wave-creating vertical motion in the water mass will be avoided. Preferably the ventilated steps should have a downwardly curved shape towards the rear, so as to oppose the least possible resistance to water flow.

In general it will be of advantage to have two steps in each side of the boat. For planing boats of normal sizes this will be entirely sufficient even if the maximum width of the steps as measured from the boat sides merely amounts to a few centimeters, and at the same time the steps will then at low speed not cause vortex formation to any undesirable extent, especially if they are given a convenient shape, i.e. if in addition to being curved forward in the upward direction as mentioned above, also in other respects they have a shape favourable to flow by tapering towards both ends.

For semiplaning boats the expedients according to the invention will be of value because at higher speeds the steps will likewise result in a ventilation of the hull sides, and hence in reduced power demand or permit higher maximum speed.

At varying velocities between minimum and maximum planing speed and assuming a fairly correct trim it will be possible for the boat at any time to have the ideal bottom width in contact with the water masses, and in waves and in curves the ventilating steps will to a great extent counteract instability caused by uneven suction on the rearwardly converging side faces of the boat.

The invention will be understood in more detail from the following description of an embodiment which is illustrated as an example in the accompanying drawings, which show a hull shape for a yawl of the planing type shaped in accordance with the invention, with all irrelevant details omitted.

DETAILED DESCRIPTION OF THE PREFERRED EMBODIMENT

The boat hull shown is of the type having bilge-keels 1 between the bottom 2 and the boat sides and having a flat stern 4 at which the bottom has considerably less width than in the cross-sectional plan PP where the width is maximum. The bottom is of usual V-shaped cross-section with an obtuse bottom angle and extends largely straight to both sides from the keel line and also largely straight in the longitudinal direction from the stern 4 past the middle with an upward curvature towards the stem.

Figure 1:
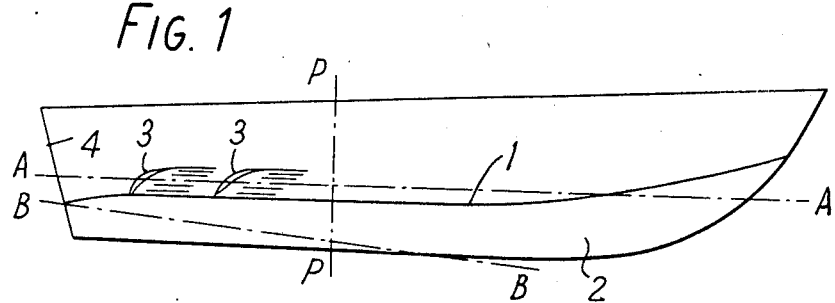
FIG. 1 is a side view of the hull.
Figure 2:
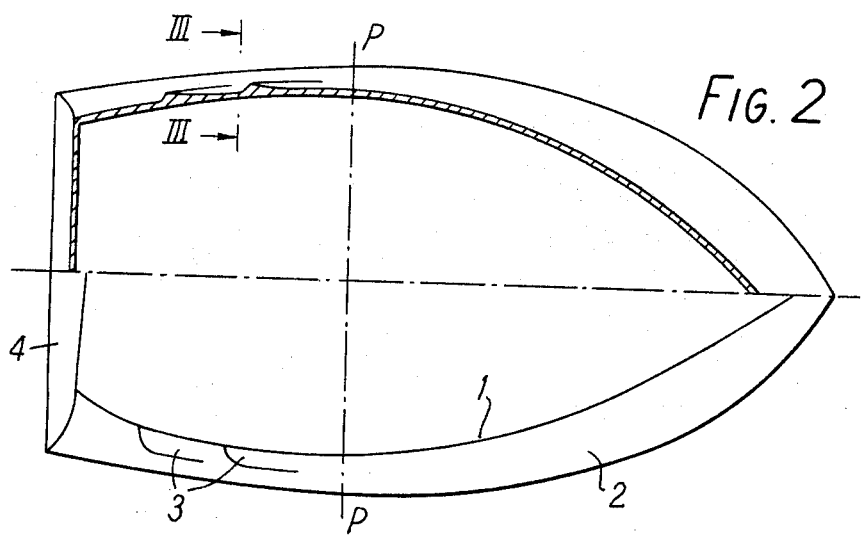
FIG. 2 is a bottom view of the hull with the upper half in horizontal section taken along the line II—II in FIG. 3.
Figure 3:
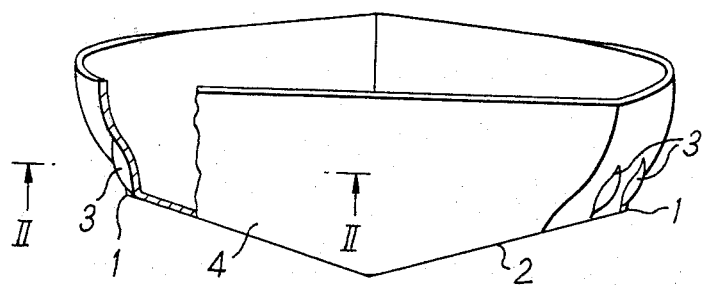
FIG. 3 is a rear view of the hull partly in section along the line III—III in FIG. 2.

Behind the cross-sectional plan PP, i.e. in the rearwardly converging portion of the boat sides, these are shaped with rearwardly facing steps 3 located and shaped as shown in the drawings. As will be seen from FIGS. 2 and 3, the steps only project by a small amount from the boat sides and have a slight forward inclination, and as appears from FIGS. 1 and 3, the width of the step decreases to zero towards both ends. Further, as best shown in FIG. 1, they start at the bilge-keel 1 and extend with decreasng inclination upwards and forwards and finally merge with the boat sides substantially parallel to the bilge-keel.

In the horizontal plane AA, which is parallel to the keel and constitutes the highest waterline, i.e. the waterline occurring at maximum submergence with the boat at rest in the water and fully loaded (for example with two persons on board) the steps 3 have about maximum width and an elevation of about 45°. During acceleration approximately up to lowest planing speed the steps will exert a ventilating action as described and, hence, in spite of the rearwardly converging boat sides substantially eliminate the rearward and downward suction of these, whereas at full planing speed up to maximum speed at which the waterline will extend substantially along the line BB the boat will for the reasons given be at least just as easy to propel as known boats especially designed for planing.

What I claim is:

1. Boat of the planing or semiplaning type, the bottom of which tapers aft with curved curvature from the cross-sectional plane of greatest width and in its rear portion is substantially straight in the longitudinal direction, characterized in that substantially at the said cross-sectional plane the boat sides are shaped with rearwardly facing exterior steps formed at approximately the maximum width of the bottom of the boat and extending from above the highest water line of the boat substantially to the respective transitions of the boat sides to the bottom.

2. Boat as claimed in claim 1, in which the bottom face meets the boat sides along bilge-keels, characterized in that the steps have their lower extremity substantially at the respective bilge-keel lines.

3. Boat as claimed in claim 1, characterized in that the number of steps in each boat side is two.

4. Boat as claimed in claim 1, characterized in that the width of the bottom at its rear end is less than 70% of its maximum width.

5. Boat as claimed in claim 1 in which additional steps are placed further behind said rearwardly facing exterior steps.

6. Boat of the planing or semiplaning type, the bottom of which tapers aft from the cross-sectional plane of greatest width and its rear portion is substantially straight in the longitudinal direction, characterized in that at the said cross-sectional plane the boat sides are shaped with rearwardly facing exterior steps formed at approximately the maximum width of the bottom of the boat and crossing the highest water line of the boat, said steps counted from the lower end having an increasing and then again decreasing width, and said steps counted from the lower end extend with decreasing elevation in the direction upwards and forwards.

7. Boat of the planing or semiplaning type, the bottom of which tapers aft from a cross-sectional plane of greatest width and in its rear portion substantially straight in the longitudinal direction, characterized in that at the said cross-sectional plane the boat sides are shaped with rearwardly facing exterior steps formed at approximately the maximum width of the bottom of the boat and crossing the highest water line of the boat, said steps counted from the lower end having an increasing and then again decreasing width, said steps counted from the lower end extend with decreasng elevation in the direction upwards and forwards from the bottom and in which the bottom face meets the boat sides along bilge-keels, and that the steps have their lower extremity substantially at the respective bilge-keel line.

8. Boat of the planing or semiplaning type, the bottom of which tapers aft from the cross-sectional plane of greatest width and in its rear portion is substantially straight in a longitudinal direction, characterized in that at the said cross-sectional plane the boat sides are shaped with rearwardly facing exterior steps formed at approximately the maximum width of the bottom of the boat and crossing the highest water line of the boat, said steps counted from the lower end have increasing and then again decreasing width.

9. Boat of the planing or semiplaning type, the bottom of which tapers aft from the cross-sectional plane of greatest width in its rear portion is substantially straight in a longitudinal direction, characterized in that at the said cross-sectional plane the boat sides are shaped with rearwardly facing exterior steps formed at approximately the maximum width at the bottom of the boat and crossing the highest water line of the boat, and said steps counted from the lower end extend with decreasing elevation in the direction upwards and forwards.

* * * * *